Patented Aug. 1, 1939

2,168,167

UNITED STATES PATENT OFFICE 2,168,167

PROCESS OF PREPARING ALKYL AND ARALKYL HALIDES

Otto Leuchs, Wuppertal-Elberfeld, Germany, assignor to I. G. Farbenindustrie Aktiengesellschaft, Frankfort-on-the-Main, Germany No Drawing. Application January 27, 1937, Serial No. 122,576. In Germany February 1, 1936

4 Claims. (Cl. 260—651)

This invention relates to a process of preparing alkyl and aralkyl halides from the corresponding ethers.

Whereas this process may be generally employed for the production of the said halides, it is of special interest in the manufacture of alkyl and aralkyl ethers of cellulose. For, in etherifying cellulose by means of alkyl and aralkyl halides various by-products are formed, principally the alcohols and ethers corresponding to the said halides, and it is often highly desirable to reconvert the said by-products into the original halides which may be again used for etherifying a further quantity of cellulose.

I have now found that alkyl and aralkyl ethers may easily and with very good yield be converted with a hydrogen halide in the presence of a heterocyclic nitrogen compound of the pyridine type and that this reaction is especially suitable for reconverting the crude or purified by-products of cellulose etherification into the original alkyl and aralkyl halides.

In reacting alkyl or aralkyl ethers with hydrogen halides at elevated temperatures the difficulty occurs that the rate of the reaction is rather slow and, furthermore, that the alkyl and aralkyl halides formed during the reaction show a tendency to be resinified, whereby the yield of the reaction is considerably impaired.

However, I have now found that by carrying out the said reaction in the presence of a heterocyclic nitrogen compound of the pyridine type, alkyl and aralkyl halides are obtained from the corresponding ethers and hydrogen halides at a very quick rate and in a high yield, since practically no resinification occurs. The heterocyclic compound of the pyridine type thus used for promoting the reaction of the ether and the halogen halide may be, for instance, pyridine, a derivative of pyridine, piperidine, quinoline (-benzopyridine) and the like. Even small amounts (for instance about 1%) of the heterocyclic compound will have a beneficient action on the course of the reaction; but the heterocyclic compound may also be used in larger proportions.

In order to carry out my present invention the alkyl or aralkyl ethers may be mixed with the heterocyclic compound and gaseous hydrogen halide, for instance, hydrogen chloride, bromide or iodide, may be passed through the mixture. In another embodiment of my invention the ether may also be heated with an aqueous solution of the hydrogen halide in the presence of the heterocyclic compound. Since the reaction is occurring in a heterogeneous medium, good agitation of the reaction mixture will be helpful. It is also preferable to perform the reaction at elevated temperatures and/or under reduced pressure so that the alkyl or aralkyl halide will be continuously removed from the reaction mixture by distillation. But the reaction may also be performed, if desired, in an autoclave under pressure.

It is furthermore to be noticed that not only alkyl and aralkyl ethers are transformed in this way into the corresponding halides, but also the alkyl and aralkyl alcohols which may be present in the mixture of by-products obtained in the etherification of cellulose.

My present invention is furthermore illustrated by the following examples without being restricted thereto. The parts are by weight:

Example 1

100 parts of dibenzylether are mixed with 7 parts of pyridine and hydrogen chloride is passed through the mixture while agitating and gradually heating to 130–170° C. during 8 hours. About 66 parts of benzylchloride and 18 parts of hydrochloric acid will distill during this time. The residue is separating into two layers of which the upper one containing benzylchloride is added to the distillate and the pure benzylchloride distilled therefrom. The lower layer containing pyridine hydrochloride may be used for converting a further quantity of ether.

In a similar way benzylbromide may be obtained by using hydrogen bromide instead of hydrogen chloride.

Example 2

100 parts of ethyl ether are heated with 220 parts of concentrated aqueous hydrochloric acid (40%) and 10 parts of pyridine in an autoclave to about 150° C. for 8 hours. Ethyl chloride is obtained therefrom in a very good yield.

Example 3

250 parts of a 2:8 mixture of benzyl alcohol and dibenzyl ether are heated with 50 parts of pyridine to 170–190° C. The mixture is well stirred and hydrogen chloride is passed through it. In a similar way as described in Example 1, 224 parts of pure benzyl chloride are obtained.

Example 4

Hydrogen chloride is passed through a mixture of 40 parts of benzyl alcohol, 60 parts of dibenzyl ether and 8 parts of pyridine at a temperature of 140° C. After 4 hours 62 parts of the mixture have distilled, the residue consisting of 78 parts. After separating the residue from water and pyridine hydrochloride it is added to the distillate and 90 g. of benzyl chloride are distilled therefrom.

*Example 5*

Hydrogen chloride is passed through a mixture of 100 parts of dibenzyl ether and 8 parts of quinoline at 140° C. while stirring. After 4 hours about 30 parts of benzyl chloride have been formed.

I claim—

1. A process for preparing alkyl and aralkyl halides which comprises reacting a compound of the group consisting of alkyl and aralkyl ethers with a hydrogen halide in the presence of a heterocyclic nitrogen compound selected from the group consisting of pyridine, piperidine and quinoline.

2. A process for preparing alkyl and aralkyl halides which comprises reacting a compound of the group consisting of alkyl and aralkyl ethers with a hydrogen halide in the presence of a heterocyclic nitrogen compound selected from the group consisting of pyridine, piperidine and quinoline and distilling the organic halide thus formed from the reaction mixture.

3. A process for preparing alkyl and aralkyl halides which comprises reacting a compound of the group consisting of alkyl and aralkyl ethers with a hydrogen halide in the presence of pyridine and distilling the organic halide thus formed from the reaction mixture.

4. A process for preparing benzyl chloride which comprises reacting dibenzyl ether with hydrogen chloride in the presence of pyridine and distilling the benzyl chloride thus formed from the reaction mixture.

OTTO LEUCHS.